United States Patent
Hopfner (10) Patent No.: US 9,649,799 B2
(45) Date of Patent: May 16, 2017

(54) TOOL FOR THE INJECTION MOLDING OF PLASTICS PARTS

(71) Applicant: BRAUNFORM GMBH, Bahlingen (DE)

(72) Inventor: Guillaume Hopfner, Elsenheim (FR)

(73) Assignee: BRAUNFORM GMBH, Bahlingen (DE)

( * ) Notice: Subject to any disclaimer, the term of this patent is extended or adjusted under 35 U.S.C. 154(b) by 0 days.

(21) Appl. No.: 14/891,232

(22) PCT Filed: May 14, 2014

(86) PCT No.: PCT/EP2014/001297
§ 371 (c)(1),
(2) Date: Nov. 13, 2015

(87) PCT Pub. No.: WO2014/183867
PCT Pub. Date: Nov. 20, 2014

(65) Prior Publication Data
US 2016/0096300 A1    Apr. 7, 2016

(30) Foreign Application Priority Data

May 15, 2013  (DE) .................. 10 2013 008 302

(51) Int. Cl.
*B29C 45/26* (2006.01)
*B29C 33/30* (2006.01)
*B29C 45/04* (2006.01)

(52) U.S. Cl.
CPC ...... *B29C 45/2673* (2013.01); *B29C 45/0408* (2013.01); *B29C 45/2675* (2013.01); *B29C 33/306* (2013.01)

(58) Field of Classification Search
CPC ... B29C 33/30; B29C 33/306; B29C 45/2673; B29C 45/2675
See application file for complete search history.

(56) References Cited

U.S. PATENT DOCUMENTS

| | | | |
|---|---|---|---|
| 2,424,235 A | 7/1947 | Hoffer | |
| 4,684,101 A | 8/1987 | Wagner et al. | |
| 5,466,145 A | 11/1995 | Takahashi | |
| 6,116,891 A | 9/2000 | Starkey | |
| 7,291,000 B2 * | 11/2007 | Ciccone | B29C 45/2675 249/102 |

FOREIGN PATENT DOCUMENTS

| | | |
|---|---|---|
| DE | 2116677 | 10/1972 |
| DE | 29816221 | 11/1998 |
| DE | 69836420 | 9/2007 |
| JP | H11935 | 1/1999 |

OTHER PUBLICATIONS

International Search Report for PCT/EP2014/001297, English translation attached to original, Both completed by the European Patent Office on Oct. 7, 2014, All together 7 Pages.

* cited by examiner

*Primary Examiner* — James MacKey
(74) *Attorney, Agent, or Firm* — Brooks Kushman P.C.

(57) ABSTRACT

A tool for the injection molding of plastics parts has two tool halves that can be moved to and from each other. A mold insert is exchangeably provided in at least one of the tool halves. In addition, a mold core is provided which is inserted in the mold insert and secured by a separate securing element.

10 Claims, 8 Drawing Sheets

TOOL FOR THE INJECTION MOLDING OF PLASTICS PARTS

CROSS-REFERENCE TO RELATED APPLICATION

This application is the U.S. national phase of PCT Application No. PCT/EP2014/001297 filed on May 14, 2014, which claims priority to DE Patent Application No. 10 2013 008 302.8 filed on May 15, 2013, the disclosures of which are incorporated in their entirety by reference herein.

The invention relates to a mold for the injection molding of plastics parts according to the preamble of claim 1.

Molds for the injection molding of plastics parts basically consist of two mold halves which are movable apart from each other and are movable together. In the closed state, the two mold halves define between them the mold cavities, into which the viscous, hot plastic is injected.

In order to be able to injection mold different plastics parts in a cost-effective manner without having to provide completely new molds, it is known that different mold inserts can be inserted into the two mold halves. This means that the mold remains unchanged as such with respect to the basic body thereof and that only the mold inserts with the half cavities thereof are formed individually. Said mold inserts can be produced at a relatively reasonable cost. The mold inserts are screwed to the actual mold.

Taking this as the starting point, the invention is based on the object of improving the mold inserts in a mold for the injection molding of plastics parts of the type specified at the beginning.

The technical solution is characterized by the features in the characterizing part of claim 1.

The basic concept in the case of the mold according to the invention for the injection molding of plastics parts resides in a quick-change system for the shaping surface, i.e. for the mold insert and/or for the mold core, depending on where the shaping surface which is to be changed is formed. Said surface can be formed in the mold insert or else—if only a relatively small surface region is intended to be changed—on the upper side of the mold core which is embedded in the mold insert. The basic concept consists here in that one or more mold cores can be inserted into the mold insert, wherein said mold cores are secured by means of a quick-change system. Said quick-change system is integrated here in the actual basic body of the mold, namely in the mold half. The quick-change system is operatively connected here to the mold core in such a manner that the mold core is drawn toward the mold half for securing purposes. By means of the reverse sequence of movement, a corresponding release can be undertaken and the mold core can be removed again.

According to an exemplarily embodiment the mold core does not serve for securing the mold insert on the mold half. A corresponding screw fastening between the mold insert and the associated mold half thereof is provided here. This means that, in this variant, the mold core has a shaping surface which is intended to be changed. For this purpose, the old mold core is removed by release of the quick-change system and replaced by another mold core. In this case, the mold core rests on a support surface of the mold half. This is because a fastening function for the actual mold insert is unnecessary.

Alternatively the mold core serves here as a securing device for securing the mold insert in the mold half. Of course, the mold core can also have a shaping surface here. The basic concept consists in that, in order to fasten the mold insert in the associated mold half by means of the mold core, said mold insert is inserted-as previously-into a corresponding recess of said mold half. One or more elongate mold cores then serve as the fastening element. In a manner corresponding thereto, the mold insert has continuous recesses. Said recesses should be understood in the very general sense to the effect of meaning that the mold insert has a continuous opening, regardless of the profiling. As a continuation of said recess, the mold half then has a corresponding continuing recess which likewise should be understood in the very general sense to the effect of meaning that said continuing recess receives the lower end of the elongate mold core. It is essential here that said elongate mold core is inserted linearly such that the laterally projecting or laterally protruding head of said elongate mold core is secured in the mold insert. The lower end of the elongate mold core is then secured in the region of the body of the associated mold half by means of a separate securing element in such a manner that the elongate mold core can no longer be drawn out of the recess. This means that the mold insert is fixed between the head of the elongate mold core and the separate securing element arranged at the other end. When the mold insert is changed, it is then merely required to transfer the separate securing element into the release position such that the elongate mold core or mold cores can then be drawn out. The mold insert is therefore free and can be removed from the mold half and replaced by another mold insert.

According to another exemplarily embodiment the mold core is preferably of T-shape design. The T shape of the mold core has the advantage that said mold core has a slender construction and therefore takes up only a little amount of space. In a manner corresponding to the T shape of the mold core, the mold insert has a recess which is of correspondingly T-shaped design in cross section.

According to an exemplarily embodiment the securing element is preferably arranged and oriented transversely with respect to the longitudinal extent of the elongate mold core. This means that, by means of this orientation, a plurality of mold cores can be secured by one and the same securing element. A further advantage consists in that the securing element is laterally accessible with respect to the mold half and can be transferred in a technically simple manner into the locking position and into the release position.

According to an exemplarily embodiment the securing element is displaceable between two positions. The first position here is the release position and the second position is the locking position. This means specifically that, in order to secure a newly inserted mold insert, it is merely necessary to displace the strip-shaped securing element in the manner of a slide such that, in the second position, a securing interaction between the securing element and the lower ends of the mold cores takes place. The advantage in the design of this securing element resides in the fact that said securing element is easily displaceable. It is thus possible for pressure to be applied to the slide-like securing element from the outside starting from the release position in order to transfer said securing element into the fixing position.

A further exemplarily embodiment proposes, that the fixing element has a slope. Said slope should be understood here in the most general sense. Said slope can thus be oblique, inclined, curved, etc., with said slope preferably being continuous. This means that, when the securing element is transferred from the release position into the locking position, the mold cores are drawn inward by the slope such that said mold cores gradually pass with the heads thereof into fixed contact with respect to the mold insert. If the mold cores are then located in the lowermost position thereof, the mold insert is clamped fixedly between the head of the mold core and the securing element. If-conversely-the securing element is transferred into the release position, the mold cores are pressed upward such that the heads appear above the mold inserts. This has the advantage that said mold cores can easily be removed by hand.

A further preferred exemplarily embodiment provides a form-fitting engagement between the lower end of the mold core and the securing element. Said form-fitting engagement has the advantage that therefore, firstly, satisfactory securing takes place and that, secondly, in the case of a form-fitting engagement running in the longitudinal direction, a displacement movement is possible which either draws the mold cores inward or-in the reverse direction-presses said mold cores outward. Said form-fitting engagement may involve mutually corresponding lateral guide strips and lateral guide grooves which intermesh. Alternatively, a dovetail guide is also conceivable. Further form-fitting engagements are conceivable.

An exemplarily embodiment discloses an alternative for the securing of the mold core. The basic concept consists in a rotary rod which is separate with respect to the mold core and is mounted rotatably in the mold half, specifically with the longitudinal axis thereof perpendicular to the shaping surface. For the securing, the rotary rod has, at the upper end thereof, an external thread which corresponds to an internal thread of the mold core. By means of corresponding rotation of the rotary rod about the longitudinal axis thereof, the external thread of said rotary rod is screwed into the internal thread of the mold core. As a result, since the rotary rod is not movable in the longitudinal direction, the mold core is drawn in and is therefore pressed against a corresponding stop surface either of the mold insert or of the mold half. If the rotary rod is rotated in the opposite direction, the mold core is thereby moved out again and can then be removed by hand when the external thread of the rotary rod becomes disengaged from the internal thread of the mold core.

According to yet another exemplarily embodiment a rack or-alternatively-a friction-locking cable or belt or chain can be provided for rotating the rotary rod. Other rotational devices are conceivable.

Finally, an exemplarily embodiment discloses a locking pin which, in the inserted state, secures the securing element, which is in the locking position, in a form-fitting manner in the locking position thereof without there being the risk of the securing element being released. Said locking pin should be understood here in the very general sense to the effect of meaning that said locking pin is guided through the body of the mold half and lies with the front end thereof in a corresponding recess in the securing element.

Two exemplary embodiments of a mold according to the invention for the injection molding of plastics parts are described below with reference to the drawings. In the latter:

FIG. 1a shows a perspective view of a first embodiment of the mold in the operating position;

FIG. 1b shows a cross section through the mold in FIG. 1a;

FIG. 1c shows a longitudinal section through the mold in FIG. 1a;

FIG. 1d shows a top view of the mold in FIG. 1a;

FIG. 5a shows a perspective view of a second embodiment of the mold in the operating position;

FIG. 5b shows a cross section through the mold in FIG. 5a;

FIG. 5c shows a longitudinal section through the mold in FIG. 5a;

FIG. 5d shows a top view of the mold in FIG. 5a;

The mold for the injection molding of plastics parts of the first embodiment of FIGS. 1 to 4 has a first mold half 1 and a second mold half (not illustrated).

The mold half 1 has a recess for receiving a mold insert 2. The half cavities for the injection molding of the plastics parts are formed in said mold insert 2.

Screws serve for securing the mold insert 2 in the mold half 1.

The mold insert 2 has two continuous recesses 3. As a continuation of said recesses 3, the body of the mold half 1 has continuing recesses 4.

Furthermore, a slide-like, strip-shaped securing element 5 is arranged in the body of the mold half 1 so as to be displaceable transversely with respect to the recesses 3 or continuing recesses 4. The special characteristic of said slide-like securing element 5 is that the upper side defines a slant.

Furthermore, a separate T-shaped mold core 6 with a head 7 is provided. Said mold core 6 defines a shaping surface on the upper side.

Finally, a pin 8 is also provided, said pin being inserted through a corresponding recess of the mold half 1 outside the mold insert 2 into said mold half 1 and engaging here by means of the front end thereof in a corresponding recess of the securing element 5.

The manner of operation is as follows:

FIGS. 1a to 1d show the locking position of the mold insert 2 in the mold half 1 thereof. This means that the lower ends of the elongate mold cores 6 are in a form-fitting engagement 9 with the securing element 5. As can be seen in particular in FIG. 1b, said form-fitting engagement 9 is formed by intermeshing strips and grooves running in the longitudinal direction of the slant.

According to FIGS. 2a to 2c, in order to release the locking device, the pin 8 is pulled out. The slide-shaped securing element 5 thereby becomes free.

As a result, according to FIGS. 3a to 3c, the slide-shaped securing element 5 can then be pulled out of the mold half 1. The special characteristic here is that, owing to the slant of the securing element 5 or the slant of the form-fitting engagement 9, during the pulling of the securing element 5 out of the mold half 1 the mold cores 6 are moved upward. Right at the end of said displacement movement, the form-fitting engagement 9 between the lower ends of the mold cores 6 and the securing element 5 then comes free.

This means that, according to FIGS. 4a to 4c, the elongate mold cores 6 can be pulled out. As a result, the mold insert 2 becomes free and can be removed from the mold half 1.

A new mold insert 2 is installed in an analogous, reverse sequence.

First of all, the new mold insert 2 is fitted into the associated recess of the mold half 1 (FIGS. 4a to 4c). Subsequently, the T-shaped mold cores 6 are inserted such that they come to lie with the lower ends thereof on the slide-shaped securing element 5 (FIGS. 3a to 3c). The slide-shaped securing element 5 is subsequently moved into the interior of the mold half 1. Owing to the slant of the securing element 5 or of the form-fitting engagement 9 which is then activated, the two mold cores 6 are drawn inward, specifically until the securing element 5 has reached the end position thereof (FIGS. 2a to 2c). Finally, the pin 8 is then also fitted in order to secure the securing element 5 in the mold half 1.

The second embodiment of FIGS. 5 to 8 differs from the first embodiment by means of the securing of the mold core 6 on the mold half 1.

Whereas, in the first embodiment, the mold core 6 is of T-shaped design, in said second embodiment the mold core 6 is of cuboidal design. However, other basic shapes are conceivable.

In any case, the mold core 6 does not have any fixedly arranged rod at the lower end thereof, as is the case in the first embodiment below the head 7 of the mold core 6. Instead, a rotary rod 10 is provided which is arranged rotatably in the mold half 1, but secured in the longitudinal direction. Said rotary rod 10 has an external thread 11 at the upper end. In a manner corresponding thereto, the mold core 6 has an internal thread.

The lower end of the rotary rod 10 has a pinion 12 which meshes with a linearly displaceable rack 13. Instead of the pinion 12 and the rack 13, a friction-locking cable or belt or a chain can also be provided.

The manner of operation is as follows:

FIGS. 5a to 5d again show the locking position of the mold insert 2 in the mold half 1 thereof by means of screws (not illustrated). The rotary rod 10 is screwed by the external thread 11 thereof into the mold core 6 in such a manner that said mold core is drawn downward in the drawing into contact with the mold half 1.

Figure 1:
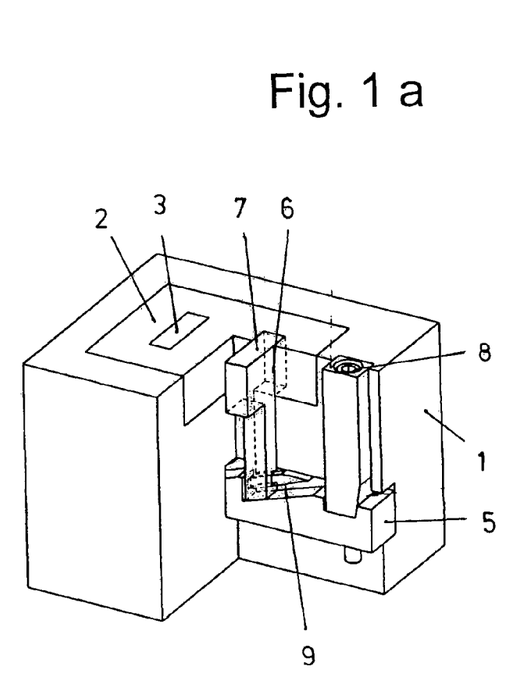
Figure 2:
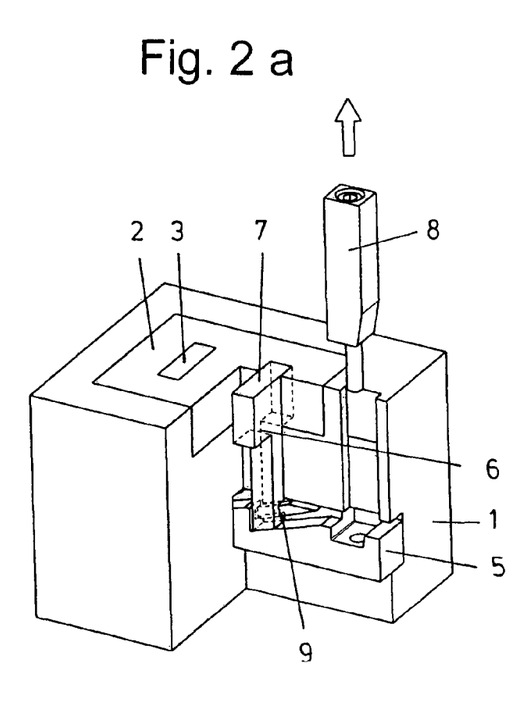
FIGS. 2a to 2c show corresponding illustrations as in FIGS. 1a to 1c after the pin has been pulled out for release purposes.
Figure 3:
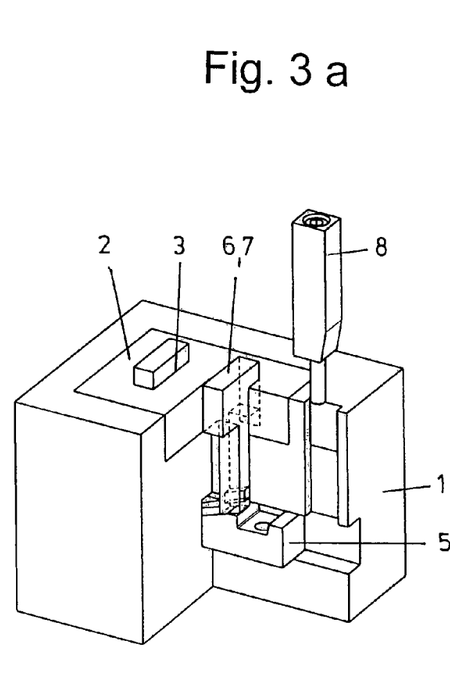
FIGS. 3a to 3c show corresponding illustrations as in FIGS. 2a to 2c after the securing element has been displaced for the removal position.
Figure 4:
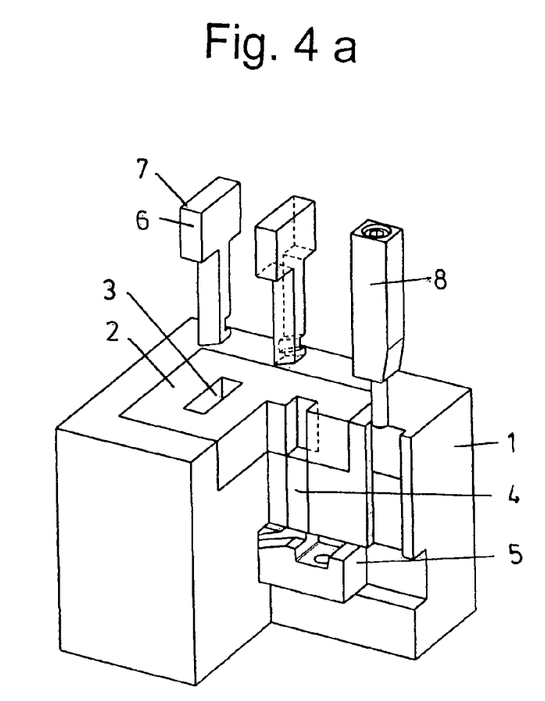
FIGS. 4a to 4c show corresponding illustrations as in FIGS. 3a to 3c after removal of the T-shaped mold cores.
Figure 5:
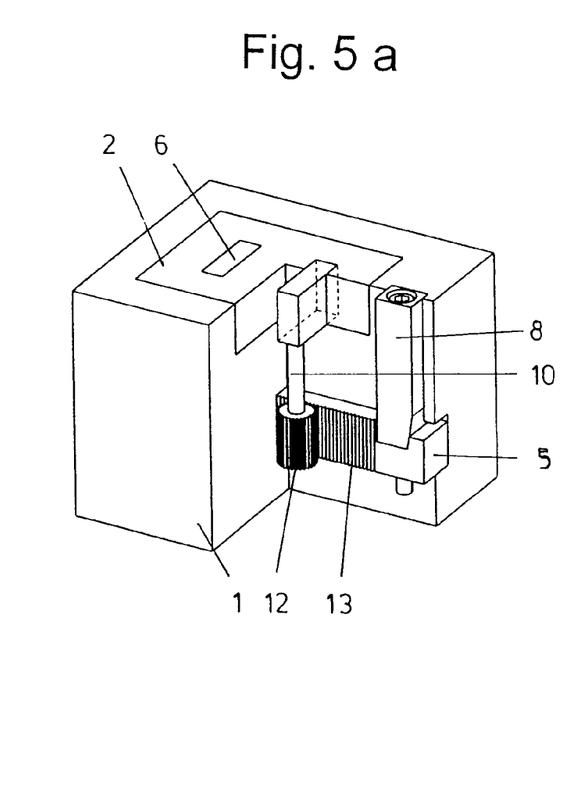
Figure 6A:
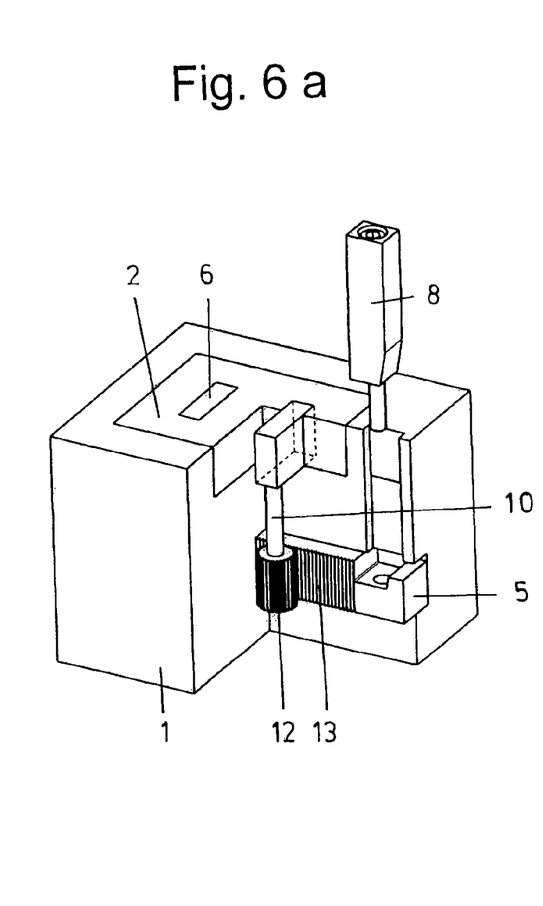
FIGS. 6a to 6c show corresponding illustrations as in FIGS. 5a to 5c after the pin has been pulled out for release purposes.
Figure 6B:
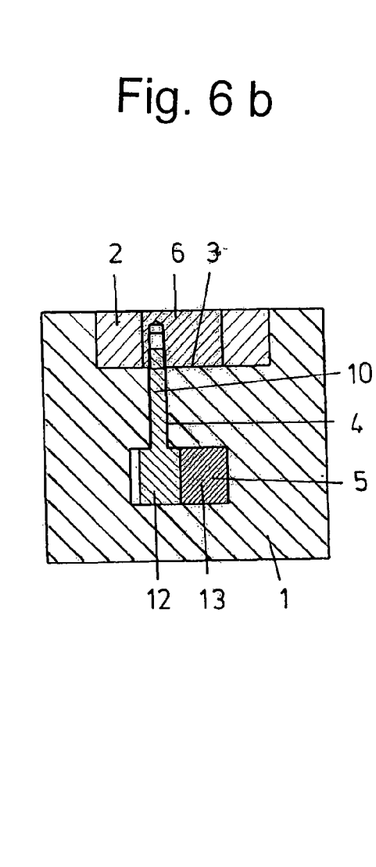
Figure 6C:
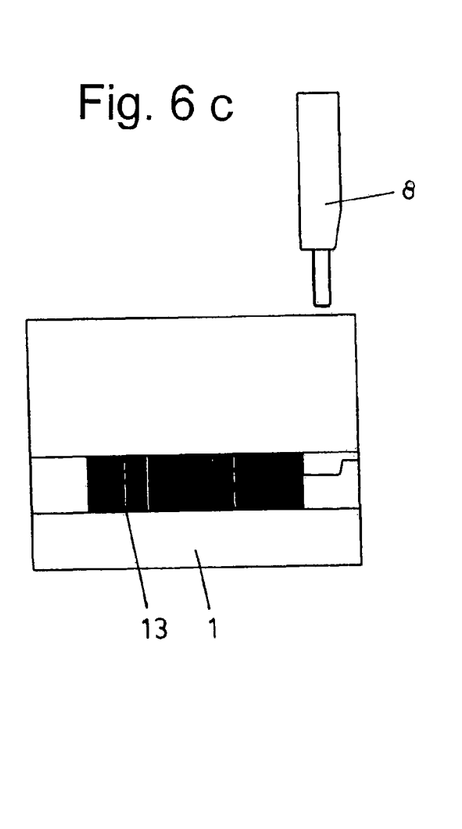
Figure 7:
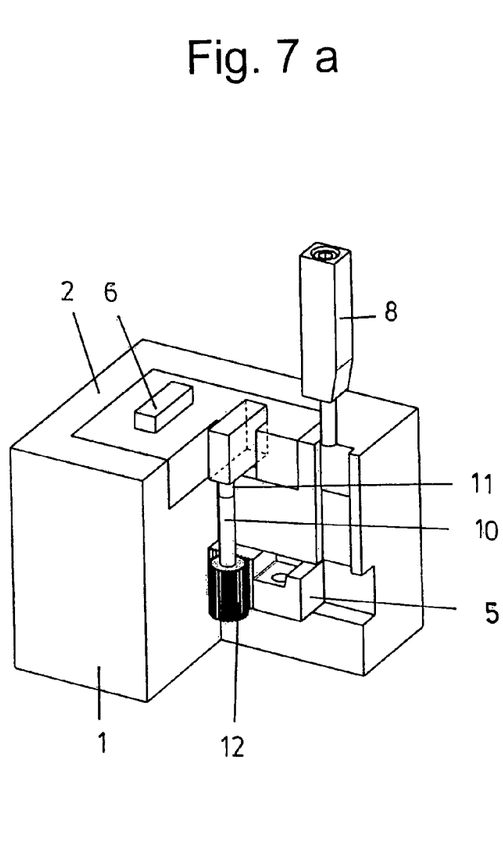
FIGS. 7a to 7c show corresponding illustrations as in FIGS. 6a to 6c after the securing element has been displaced for the removal position.
Figure 8:
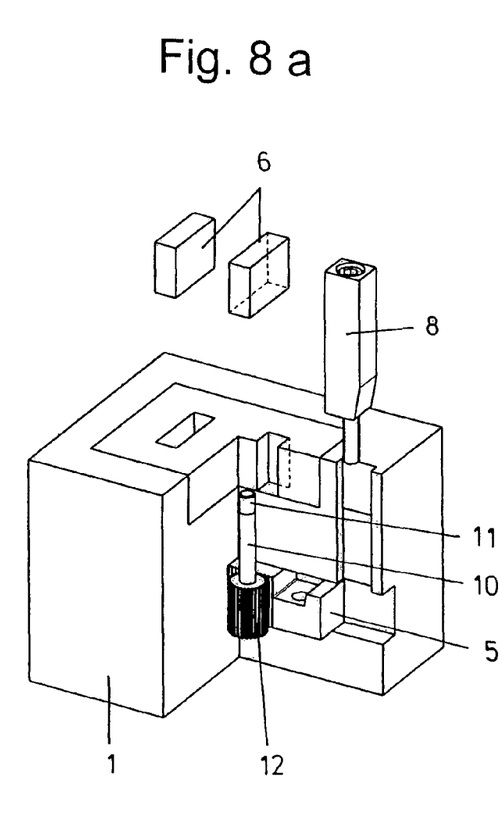
FIGS. 8a to 8c show corresponding illustrations as in FIGS. 7a to 7c after removal of the T-shaped mold cores.

According to FIGS. 6a to 6c, in order to release the locking device, the pin 8 is pulled out. The securing element 5 in the form of the rack 13 thereby becomes free. Also here, as in the first embodiment, the movement of the rack 13 can be carried out by hand, by means of a motor, pneumatically, electrically, hydraulically or in some other manner.

According to FIGS. 7a to 7c, the rack 13 can therefore be pulled out of the mold half 1. As a result, the rotary rod 10 is set into a rotational movement. Since said rotary rod is secured longitudinally, the rotating rotary rod 10 pushes the mold core 6 out because of the thread until the two threads become free from each other.

This means that, according to FIGS. 8a to 8c, the mold cores 6 can be pulled out by hand.

The mold cores 6 are installed in an analogous reverse sequence, i.e. the mold cores 6 are inserted, and then the rotary rod 10 is set into a rotational movement by means of the rack 13 such that the external thread 11 of the rotary rod 10 engages in the internal thread of the mold core 6. Upon further movement of the rack 13, the mold core 6 is drawn into the end position thereof. Finally, the pin 8 is then also fitted in order to secure the rack 13.

In an alternative to the two embodiments, the T-shaped mold core 6 can also be used for securing the mold insert 2 on the mold half 1. For this purpose, the mold insert 2 has a T-shaped recess 3 which corresponds to the T-shaped mold core 6 and has a support surface for the head 7 of the mold core 6, against which support surface the head 7 is pressed during clamping.

LIST OF REFERENCE NUMBERS

1 Mold half
2 Mold insert
3 Recess
4 Continuing recess
5 Securing element
6 Mold core
7 Head
8 Pin
9 Form-fitting engagement
10 Rotary rod
11 External thread
12 Pinion
13 Rack

The invention claimed is:

1. A mold for the injection molding of plastics parts, comprising:
   two mold halves which are movable apart from each other and are movable to each other along a mold axis,
   a mold insert having at least one mold cavity is arranged exchangeably in at least one mold half,
   wherein,
      in the closed state the mold insert and the two mold halves define at least one closed mold cavity for the injection molding of the plastics parts,
      the mold insert has a plurality of continuous recesses extending there through which extend parallel to the mold axis, and
      the mold half having the mold insert has a plurality of axially aligned continuing recesses each forming a continuation of a respective one of the recesses in the mold insert,
   a plurality of exchangeable mold cores are provided, which are insertable parallel to the mold axis into the plurality of recesses of the mold insert, and
   a single securing element arranged and aligned in each mold half associated with a mold insert, the securing element in the mold half extending transversely to the mold axis and cooperating with the plurality of mold cores to releasably fasten the mold insert to the associated mold half.

2. The mold as claimed in claim 1, wherein the mold core rests on a support surface of the mold half or on a support surface of the mold insert.

3. The mold as claimed in claim 1, wherein the mold core is fixed in a recessed manner with a protruding head within the mold insert and rests on a support surface of the mold half or on a support surface of the mold insert.

4. The mold as claimed in claim 3, wherein the mold core is of T-shaped design.

5. The mold as claimed in claim 1, wherein the mold core projects on a lower end into the continuing recess of the mold half, and
   in that the securing element is displaceable between first and second positions,
   wherein the lower end of the mold core is free in the first position, and
   wherein, after displacement of the securing element into the second position, the lower end of the mold core is secured.

6. The mold as claimed in claim 5, wherein the securing element is formed with a slope on the corresponding side thereof at the lower end of the mold core.

7. The mold as claimed in claim 5, wherein a form-fitting engagement is provided between the lower end of the mold core and the securing element.

8. The mold as claimed in claim 1, wherein a rotary rod which is separate from the mold core is arranged rotatably in the continuing recess, the mold core has an internal thread and an upper end of the rotary rod has an external thread corresponding thereto, and the rotary rod is rotatable in such a manner that, as the external thread thereof is screwed into the internal thread of the mold core, said rotary rod draws said mold core in.

9. The mold as claimed in claim 8, wherein a rack or a friction-locking cable or belt or chain is provided as the securing element for rotating the rotary rod.

10. The mold as claimed in claim 5, wherein, in order to secure the securing element in the second position thereof, a pin which is insertable into the mold half and into the securing element is provided.

\* \* \* \* \*